United States Patent
Mcdonagh et al.

(10) Patent No.: US 12,544,708 B2
(45) Date of Patent: Feb. 10, 2026

(54) AMINE SOLVENT-BASED CARBON CAPTURE COMPOSITIONS

(71) Applicant: International Business Machines Corporation, Armonk, NY (US)

(72) Inventors: James Mcdonagh, Frodsham (GB); Benjamin Hardy Wunsch, Mt. Kisco, NY (US); Theodore G. van Kessel, Millbrook, NY (US); Flaviu Cipcigan, Warrington (GB)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 18/171,709

(22) Filed: Feb. 21, 2023

(65) Prior Publication Data
US 2024/0286074 A1   Aug. 29, 2024

(51) Int. Cl.
*B01D 53/14* (2006.01)
*B01D 53/18* (2006.01)
(Continued)

(52) U.S. Cl.
CPC ..... *B01D 53/1493* (2013.01); *B01D 53/1425* (2013.01); *B01D 53/1475* (2013.01);
(Continued)

(58) Field of Classification Search
None
See application file for complete search history.

(56) References Cited

U.S. PATENT DOCUMENTS

| 8,119,091 B2 | 2/2012 | Keith et al. |
| 8,298,986 B2 | 10/2012 | Jones et al. |

(Continued)

FOREIGN PATENT DOCUMENTS

| CA | 1091429 A | 12/1980 |
| CN | 107149851 A | 9/2017 |
| WO | 2022/227146 A1 | 11/2022 |

OTHER PUBLICATIONS

International Searching Authority, "Notification of Transmittal of the International Search Report and the Written Opinion of the International Searching Authority, or Declaration," Patent Cooperation Treaty, Jul. 3, 2024, 20 pages, International Application No. PCT/IB2024/050907.
(Continued)

*Primary Examiner* — Daniel Berns
(74) *Attorney, Agent, or Firm* — Kelsey M. Skodje

(57) ABSTRACT

A composition for carbon dioxide ($CO_2$) capture includes 2-aminocyclohexanol, cis-1,2-diaminocyclohexane, meglumine, or combinations thereof. A process of $CO_2$ capture includes mixing a $CO_2$-containing gas with the composition. A system includes a component for receiving a gas and the composition, which absorbs $CO_2$ from the gas. A further composition includes a first amine solvent selected from 2-aminocyclohexanol, cis-1,2-diaminocyclohexane, and meglumine and a second amine solvent independently selected from 2-aminocyclohexanol, cis-1,2-diaminocyclohexane, meglumine, ethyl diethanolamine, dimethylethanolamine, piperidine, 2-amino-2-methyl-1-propanol, and monoethanolamine. A further process includes reacting $CO_2$ with an amine selected from 2-aminocyclohexanol, cis-1,2-diaminocyclohexane, and meglumine.

12 Claims, 2 Drawing Sheets

(51) Int. Cl.
  *B01D 53/62* (2006.01)
  *B01D 53/78* (2006.01)
  *B01D 53/96* (2006.01)

(52) U.S. Cl.
  CPC .............. *B01D 53/18* (2013.01); *B01D 53/62* (2013.01); *B01D 53/78* (2013.01); *B01D 53/96* (2013.01); *B01D 2252/2041* (2013.01); *B01D 2252/20484* (2013.01); *B01D 2252/20489* (2013.01); *B01D 2257/504* (2013.01); *B01D 2258/0283* (2013.01)

(56) References Cited

U.S. PATENT DOCUMENTS

| | | |
|---|---|---|
| 8,377,173 B2 | 2/2013 | Chuang |
| 8,816,078 B2 | 8/2014 | Rochelle et al. |
| 8,945,280 B2 | 2/2015 | Holub et al. |
| 9,321,007 B2 | 4/2016 | Rochelle et al. |
| 9,782,719 B1 | 10/2017 | Iyer |
| 10,434,461 B2 | 10/2019 | Mao et al. |
| 2013/0053614 A1 | 2/2013 | Jackson et al. |
| 2016/0101385 A1 | 4/2016 | Mao |
| 2016/0296882 A1 | 10/2016 | Murai et al. |
| 2017/0106331 A1 | 4/2017 | Aronu et al. |
| 2017/0232380 A1 | 8/2017 | Widger et al. |

OTHER PUBLICATIONS

Biosynth, "FA152219|6936-47-6|cis-2-Aminocyclohexanol hydrochloride," https://www.biosynth.com/p/FA152219/6936-47-6-cis-2-aminocyclohe, printed Oct. 17, 2022, 2 pgs.

Fisher Scientific Company, "2-Methylcyclohexanol, mixture of cis and trans," Safety Data Sheet, Creation Date Nov. 6, 2010, Revision Date Dec. 24, 2021, Revision No. 5, 8 pgs.

Github—kmansouri, "Opera: Free and open-source application (command line and GUI) providing QSAR models predictions as well as applicability domain and accuracy assessment for physiochemical properties, environment fate and toxicological endpoints," https://github.com/kmansouri/OPERA, printed Oct. 17, 22, 1 pg.

Marques et al., "Chapter 12—Sorbitol Production From Biomass and Its Global Market," Platform Chemical Biorefinery, Future Green Industry, http://dx.doi.org/10.1016/B978-0-12-802980-0.00012-2, pp. 217-227.

Millipore Sigma, "cis-1,2-Diaminocyclohexane," https://www.sigmaaldrich.com/US/en/product/aldrich/307467, printed Oct. 17, 2022, 6 pgs.

Millipore Sigma, "Meglumine CAS 6284-40-8 | 106143," https://www.emdmillipore.com/US/en/product/Meglumine, MDA_CHEM-106143, printed Nov. 8, 2022, 3 pgs.

Pubchem, "1,2-Cyclohexanediamine," https://pubchem.ncbi.nlm.nih.gov/compound/1_2-Cyclohexanediamine, printed Oct. 17, 2022, 77 pgs.

Pubchem, "cis-2-Aminocyclohexanol," https://pubchem.ncbi.nlm.nih.gov/compound/cis-2-Aminocyclohexanol, printed Oct. 17, 2022, 19 pgs.

Pubchem, "Ethanolamine," https://pubchem.ncbi.nlm.nih.gov/compound/700, printed Oct. 17, 2022, 200 pgs.

Pubchem, "Meglumine|C7H17N05," https://pubchem.ncbi.nlm.nih.gov/compound/8567, printed Oct. 17, 2022, 67 pgs.

Puxty et al., "Carbon Dioxide Postcombustion Capture: A Novel Screening Study of the Carbon Dioxide Absorption Performance of 76 Amines", Environ. Sci. Technol. 2009, 43, pp. 6427-6433.

Unknown, "Appendix I. Toxicity Categories and LOCs", United States Environmental Protection Agency, printed Oct. 17, 2022, 1 page, <https://www3.epa.gov/pesticides/endanger/litstatus/effects/redleg-frog/naled/appendix-i.pdf>.

Wikipedia, "1,2-Diaminocyclohexane," https://en.wikipedia.org/wiki/1,2-Diaminocyclohexane, page last updated Mar. 8, 2022, 3 pgs.

AMINE SOLVENT-BASED CARBON CAPTURE COMPOSITIONS

BACKGROUND

The present disclosure relates to carbon capture technology and, more specifically, to carbon dioxide ($CO_2$) capture by amine solvent molecules.

Carbon capture technology includes techniques for capturing atmospheric $CO_2$ in order to offset $CO_2$ emissions, as well as techniques for transferring and chemically transforming $CO_2$, which may be used to store the captured $CO_2$ or produce synthetically useful compounds. For example, captured $CO_2$ may be used as a feedstock in the synthesis of polymeric materials. Upcycling $CO_2$ into useful monomers may also facilitate a shift in production away from standard, fossil fuel intensive approaches that employ highly toxic chemicals, such as phosgene. However, current methods are limited by available materials for capturing and reacting with $CO_2$. For example, techniques that use amine solvents to capture $CO_2$ could be improved by amine solvents, or mixtures thereof, with increased $CO_2$ capacities and reaction rates (e.g., relative to solvents such as monoethanolamine).

SUMMARY

Various embodiments are directed to a composition for carbon dioxide ($CO_2$) capture that includes 2-aminocyclohexanol, cis-1,2-diaminocyclohexane, meglumine, or combinations thereof. This composition may offer advantages over existing $CO_2$ capture materials, including amine solvent-based compositions known in the art. For example, the composition includes amine solvents that may enable higher $CO_2$ capture capacities and/or faster rates of capture than existing methods. In some embodiments, the composition includes an additional amine solvent selected from the group consisting of methyl diethanolamine, dimethylethanolamine, piperidine, 2-amino-2-methyl-1-propanol, and monoethanolamine. The composition may also be an aqueous solution of the amine solvent(s). In embodiments where the composition includes more than one amine solvent and/or is an aqueous solution, concentrations of the amine(s) may be varied. For example, the aqueous solution can have amine concentrations of about 5-40% by weight. This may advantageously provide compatibility with existing amine solvent-based techniques and optimization of the $CO_2$ capture capacity and reaction rates.

Additional embodiments are directed to a process of $CO_2$ capture that includes mixing a $CO_2$-containing gas with the composition. This process may enable more efficient capture of $CO_2$ than existing techniques. In some embodiments, the $CO_2$-containing gas is from a post-combustion gas stream. This may allow reduction in the amount of $CO_2$ released into the atmosphere from industrial processes. The process can also include obtaining a $CO_2$-rich amine solution formed by absorption of $CO_2$ during the mixing. The $CO_2$ may be removed from the solution in order to regenerate the composition, e.g., by mineralization of the $CO_2$ or treatment with pressurized steam. This can provide effective ways of storing and transferring the captured $CO_2$. Additionally, the regenerated composition may be mixed with new $CO_2$-containing gas in some embodiments. This may increase the amount of $CO_2$ that can be absorbed by the composition.

Further embodiments are directed to a system that includes the composition and a component for receiving a gas from which $CO_2$ is absorbed by the composition. The system may also include a component for removing the absorbed $CO_2$ to regenerate the composition. The system may provide advantages substantially similar to those discussed above with respect to the process.

Various embodiments are directed to an additional composition, which includes a first amine solvent selected from 2-aminocyclohexanol, cis-1,2-diaminocyclohexane, and meglumine and a second amine solvent independently selected from 2-aminocyclohexanol, cis-1,2-diaminocyclohexane, meglumine, ethyl diethanolamine, dimethylethanolamine, piperidine, 2-amino-2-methyl-1-propanol, and monoethanolamine. In some embodiments, this composition has up to a 1:4 ratio of the first amine to the second amine. The additional composition may also be used to capture and transfer $CO_2$ more efficiently than techniques using existing amine formulations.

Additional embodiments are directed to a process that includes reacting $CO_2$ with an amine selected from 2-aminocyclohexanol, cis-1,2-diaminocyclohexane, and meglumine. This process may enable more efficient capture of $CO_2$ than techniques using existing amine formulations. The process can also include removing a product of the reaction. In some embodiments, the reaction is a carbonate. This can allow storage and utilization of the captured $CO_2$.

The above summary is not intended to describe each illustrated embodiment or every implementation of the present disclosure.

BRIEF DESCRIPTION OF THE DRAWINGS

The drawings included in the present application are incorporated into, and form part of, the Specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
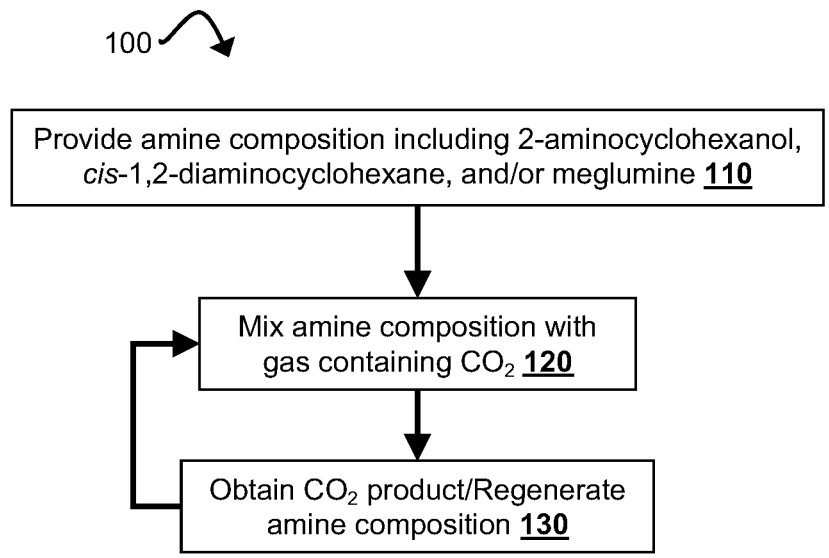
FIG. 1 is a flowchart illustrating a process of capturing $CO_2$, according to some embodiments of the present disclosure.

Embodiments of the present disclosure are generally directed to carbon capture technology and, more specifically, to solvent molecules for capturing and reacting with gaseous carbon dioxide ($CO_2$). While the present disclosure is not necessarily limited to such applications, various aspects of the disclosure may be appreciated through a discussion of examples using this context.

Techniques for reducing atmospheric $CO_2$ are essential for the goal of limiting the global temperature rise to 1.5° C. by 2050. Point source capture, zero-emission technologies, such as renewables for energy production, and reduced-emission programs are expected to lower emissions (e.g., by about 800-900 Mt/yr). However, these efforts cannot offset $CO_2$ from long distance travel/cargo transport and certain heavy industries (expected to account for 15+% emissions annually), nor can they remove already-emitted $CO_2$ from the atmosphere.

Carbon capture (also referred to herein as "$CO_2$ capture") requires selectively removing $CO_2$ from a gas stream or atmosphere. Current technology for emission control focuses on post-combustion capture of $CO_2$ from the output gas streams of point-source generators such as power plants and heavy industry. Several technologies have been developed, including selective membranes, solid sorbents (e.g., zeolites, alkaline salts, and alkaline solutions), and aqueous organic amine solutions. For example, amines can capture $CO_2$ through chemisorption and conversion to a carbamate or carbonate, which can be released by heating or pressure swing.

Existing chemisorption technologies used for point-of-generation capture of about 5-30% by volume can require 2-4 gigajoules (GJ) per metric ton (t) of $CO_2$. The regeneration energy needed to release the $CO_2$ from capture reagents dominates the energy costs. As an example, current amine-scrubbing plants use aqueous amine solutions that capture $CO_2$ at about 25-40° C. and release the $CO_2$ at about 100-150° C. with flow rates of thousands of tons per hour, thus requiring heating and cooling of significant quantities of fluid. A key chemical challenge remains to produce new molecules that can capture $CO_2$ and regenerate/release the captured $CO_2$ with a minimum energy budget.

In commercial systems for carbon capture using amine solutions, the amine solution is a core operation cost. State-of-the-art amine formulations typically employ blends of amines, which can allow cooperative effects between high capacity/slow reacting amines and low capacity/fast reacting amines. Improvements in either amine type can allow better formulations by increasing capture capacity and rate of capture. However, amines are a vast class of chemicals with many sub-classes and usages, from pharmaceuticals and biological processes to fertilizers and carbon capture. In addition to the requirements for sufficiently high capture capacities and reaction rates, amines selected for $CO_2$ capture formulations must satisfy safety requirements. For example, amines that can negatively impact health and/or the environment when used on an industrial scale may not be appropriate for $CO_2$ capture processes. Therefore, identifying amines suitable for carbon capture presents significant challenges.

Various embodiments of the present disclosure may be used to overcome these and other challenges. Solvent-based carbon capture requires a trade-off between the reaction rate at which a reaction with $CO_2$ can occur (reaction kinetics) and the amount of $CO_2$ that can be sequestered per molecule of capture solvent (capture capacity). Disclosed herein are carbon capture techniques using amine-based compositions. In some embodiments, the compositions include amine solvent molecules that may have both improved reaction kinetics and carbon capture capacity relative to existing carbon capture formulations (e.g., monoethanolamine (MEA) and other amine solvents and mixtures). In some embodiments, the disclosed carbon capture compositions are used in post-combustion solvent-based carbon capture using thermal swing capture.

In some embodiments, the disclosed $CO_2$-capture solvents can include cis- and/or trans-2-aminocyclohexanol-collectively, "2-aminocyclohexanol", represented by the following structure:

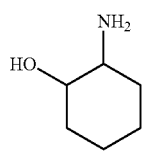

In further embodiments, the disclosed compositions can include cis-1,2-diaminocyclohexane, which has the following structure:

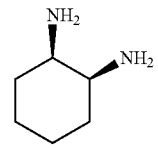

In additional embodiments, the disclosed compositions can include meglumine, which has the following structure:

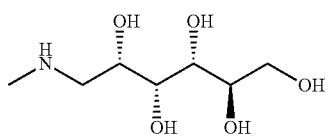

The amine solvents may also be in a solution (e.g., an aqueous solution) containing at least one of cis-1,2-diaminocyclohexane, 2-aminocyclohexanol, meglumine. The mixture may optionally include at least one additional primary, secondary, and/or tertiary amine. Primary, secondary, and tertiary amine moieties can be generically represented by

and

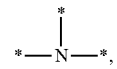

respectively, where each starred bond is to a carbon atom.

Further, the disclosed amine solvents may satisfy safety requirements for use in large-scale $CO_2$ capture. For example, cis-1,2-diaminocyclohexane, 2-aminocyclohexanol, and meglumine are each predicted to have lower toxicities than MEA, which is commonly used for $CO_2$ capture. That is, median lethal dose ($LD_{50}$) values predicted computationally for each of cis-1,2-diaminocyclohexane, 2-aminocyclohexanol, and meglumine are lower than the $LD_{50}$ of MEA.

Referring now to the drawings, in which like numerals represent the same or similar elements, FIG. 1 is a flowchart illustrating a process 100 of capturing $CO_2$, according to some embodiments of the present disclosure. For illustrative purposes, process 100 is discussed with reference to the carbon capture environment 200 of FIG. 2. However, process 100 may be carried out using any appropriate apparatus and techniques consistent with amine-based $CO_2$ capture. Various types of apparatus may be used in mediating absorption in process 100 (see below). Techniques for gas-liquid mass transfer known to those of ordinary skill may be employed, and parameters such as flow rates, temperatures, concentrations, residence times, packing or tray types, nozzle design, droplet size (in spray methods) can be tuned.

Figure 2:
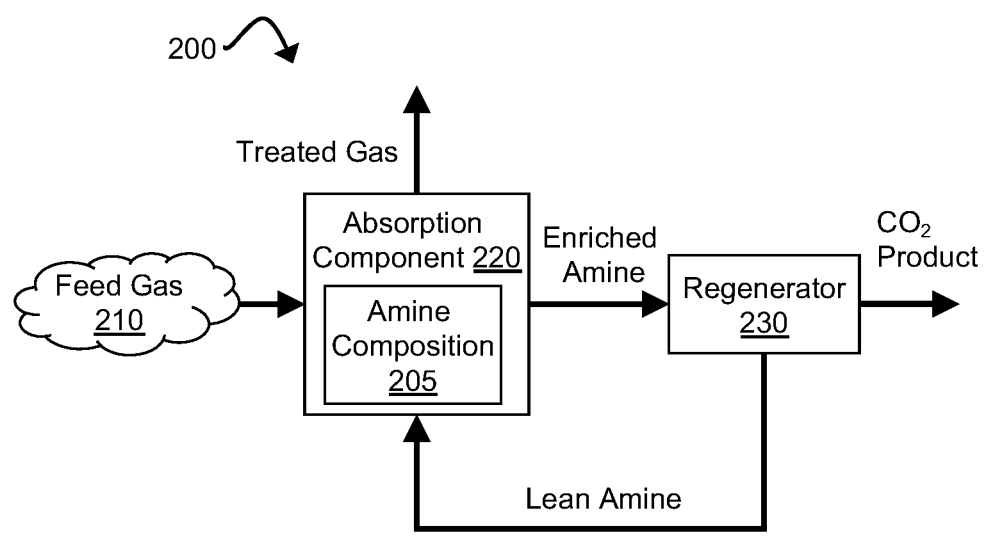
FIG. 2 is a block diagram illustrating a carbon capture environment, according to some embodiments of the present disclosure.

FIG. 2 is a block diagram illustrating a simplified carbon capture environment 200, according to some embodiments of the present disclosure.

An amine composition 205 that includes at least one solvent selected from 2-aminocyclohexanol, cis-1,2-diaminocyclohexane, and meglumine is provided. This is illustrated at operation 110. In some embodiments, the amine composition 205 is an aqueous solution of at least one of the amine solvent(s) cis-1,2-diaminocyclohexane, 2-aminocyclohexanol, and meglumine. The amine composition 205 may be an aqueous solution of the amine solvent(s) with about 5-40% amine (e.g., ~5-30% or ~20-40% amine). Herein, concentrations (% amine) refer to weight percent (% w/w) unless otherwise noted. by weight (w/w) may be used as well. In some embodiments, the amine composition 205 may be an aqueous solution of about 33% cis-1,2-diaminocyclohexane, 2-aminocyclohexanol, and/or meglumine. The amine composition 205 may optionally include at least one additional primary, secondary, and/or tertiary amine. In some embodiments, the amine composition 205 is an aqueous solution with a total amine solvent concentration of about 5-40%, 5-30%, 20-40%, or any other appropriate solvent concentration.

Amines that can be blended with 1,2-diaminocyclohexane, 2-aminocyclohexanol, and/or meglumine in the amine composition 205 may include methyl diethanolamine (MDEA), dimethylethanolamine (DMEA), piperidine, 2-amino-2-methyl-1-propanol, MEA, or any other suitable amine. For example, the amine composition 205 may include a mixture of about 1-20% 1,2-diaminocyclohexane, 2-aminocyclohexanol, and/or meglumine combined with about 99-80% MDEA or DMEA. In some embodiments, the amine composition 205 includes about 5-40% of the mixture in an aqueous solution.

The amine composition 205 can be mixed with a $CO_2$-containing gas ("feed gas 210"). This is illustrated at operation 120. For example, the feed gas 210 can be directed into an absorption component 220 containing the amine composition 205. When the feed gas 210 enters the absorption component 220, the $CO_2$ can be absorbed by the amine solvent molecules of the amine composition 205. For example, the amine solvents can act as "activators" in a post-combustion scrubbing formulation consistent with formulations known in the art.

The absorption component 220 may be a trayed adsorption column. In these instances, the feed gas 210 may be continuously introduced at the bottom of the column while a $CO_2$-absorbing liquid (the amine composition 205) is introduced at the top of the column. As the gas and liquid phases mix in the column, the gas can percolate on trays positioned in the column to allow sufficient residence time for gas absorption into the liquid phase. The gas remaining ("treated gas") after $CO_2$ is absorbed from the feed gas 210 can then be collected at the top of the column, and the $CO_2$-containing amine composition 205 ("enriched amine") can be collected at the bottom of the column for further downstream processing. Downstream processing is discussed in greater detail below with respect to operation 130.

In some embodiments, the absorption component 220 may be a spray tower or a spray dryer. In a spray tower, the amine composition 205 can be sprayed from the top of the tower into the feed gas 210. When a spray dryer is used, a controlled mist of the amine composition 205 can be introduced into a tower or column concurrently with the feed gas 210. In the spray dryer, both the amine composition 205 and the feed gas 210 may be heated to ensure evaporation of the liquid phase. In either the spray tower or the spray dryer, the enriched amine can then be collected (e.g., at the bottom of the tower/column) for further downstream processing.

The captured $CO_2$ can be transferred and/or stored as $CO_2$ or a product of $CO_2$ activation. This is illustrated at operation 130. At operation 130, the amine composition 205 may be regenerated upon transfer of the captured $CO_2$. FIG. 2 illustrates captured $CO_2$ being released from a regeneration component ("regenerator") 230 as a "$CO_2$ product". In some embodiments, the $CO_2$ product is gaseous or liquid carbon dioxide. In these instances, operation 130 may include heating and/or changing the pressure of the enriched amine, causing the $CO_2$ to be released from the solution and collected. For example, the enriched amine can be pumped to the regenerator 230 (e.g., a stripping column), which applies pressurized steam to release the captured $CO_2$ from the enriched amine and regenerate the amine solution ("lean amine"), which is then returned to the absorption component 220.

In further embodiments, the $CO_2$ product may be a reaction product formed by activation of the captured $CO_2$. For example, $CO_2$ can be activated by the amine solvent molecules and reacted to form carbonate or carbamate products. These products may be minerals, organic molecules, polymers, etc. For example, the $CO_2$ product may be a mineral formed by reacting the absorbed/activated $CO_2$ with a metal halide (MX or $MX_2$), such as a metal chloride where M is sodium, potassium, magnesium, calcium, etc. This can result in mineralization of the $CO_2$, wherein a bicarbonate ($MHCO_3$) or carbonate ($MCO_3$) is formed by the reaction. For example, sodium bicarbonate ($NHCO_3$) can form when MX is NaCl, calcium carbonate ($CaCO_2$) can form when $MX_2$ is $CaCl_2 \cdot 2H_2O$, and magnesium carbonate ($MgCO_3$) can form when $MX_2$ is $MgCl_2$. The solid (bi)carbonate can be removed from the solution by filtration, resulting in the regenerated composition 205 (lean amine).

In some embodiments, the regenerated amine composition 205 formed at operation 130 can be reused to capture $CO_2$ from new feed gas 210. In these instances, process 100 can return to operation 120 after regeneration at operation 130. Additional cycles of operations 120 and 130 may be carried out as well, e.g., where feed gas 210 is continuously introduced at operation 120. In other embodiments, process 100 may end after operation 130.

Figure 3:
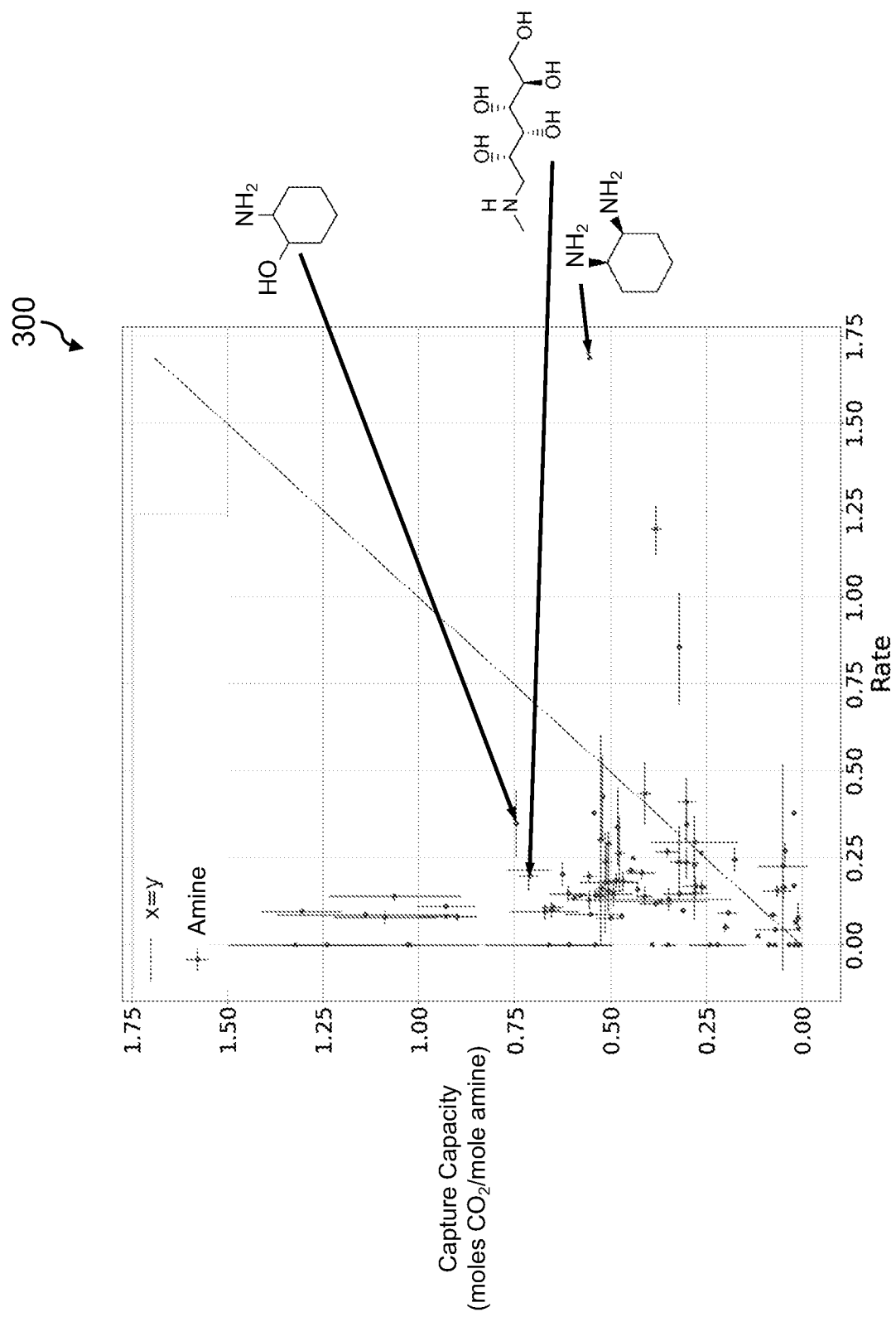
FIG. 3 is a graph plotting experimentally obtained carbon capture capacities and reaction rates for a set of amine solvents.

FIG. 3 is a graph 300 illustrating experimentally obtained carbon capture capacities (moles $CO_2$/mole amine) and corresponding reaction rates (per second) of a set of amines. The graph 300 plots experimental results obtained by monitoring a set of reactions between $CO_2$ and ninety-nine different amines, including MEA, 2-aminocyclohexanol, cis-1,2-diaminocyclohexane, and meglumine.

The measurement principle illustrated in FIG. 2 is that $CO_2$ lost in an exhaust stream (e.g., feed gas 110) is absorbed in an amine solution (e.g., amine composition 205). Quantification of the gas content as a function of time t and integration affords the amount of $CO_2$ absorbed and, therefore, capture capacity a (moles $CO_2$/mole amine) of the amine. In theory, an optimal capture capacity a is ~0.5 per amine group. Therefore, an ideal carbon capture solvent may sit at the top right of this graph 200 (e.g., by capturing more than one $CO_2$ molecule per molecule of amine (A>0.5) at a fast rate). The mean capture capacity of the 99 points plotted in FIG. 2 is $\alpha = \sim 0.43$. The distribution of the plotted capture capacities is multimodal, with populations centered around $\alpha = \sim 0.0$, ~0.27, and ~0.49, as well as a low-sampled population at $\alpha = \sim 1.0$.

The data shown in FIG. 2 was obtained by testing the ninety-nine aqueous amine solutions for $CO_2$ absorption based on infrared (IR) absorbance. The amine solutions were each prepared by dissolving the amine in water at a concentration of about 30% amine, by weight (w/w), as this concentration is typical in currently deployed industrial offerings. Nominally 200 µL samples of the amine solutions were held at about 40° C. using a 200 mL water bath, this temperature chosen to fit that of a typical industrial $CO_2$ absorption unit. An approximately 10 SCCM (standard cubic centimeters per minute, equivalent to $1.67 \cdot 10^{-7}$ $m^3 \cdot s^{-1}$), gas stream was bubbled into each amine solution and the exhaust gas analyzed for $CO_2$ at the 4.3 µm absorption band. Run times for the monitored reactions varied from 5-120 minutes.

A 3.9 µm reference band was used to account for slight attenuation due to humidity and signal drift. The absorption signal was calibrated against atmosphere (~414 ppm $CO_2$), $CO_2$ balance nitrogen calibration gas (9.96% $CO_2$, by volume, or "10% v/v"), and substantially pure $CO_2$ gas, as a function of flow rate q=2-40 SCCM. Aqueous MEA (30% w/w) was used as a calibrant as it has a well-established capture capacity a ~0.50. The estimated measurement apparatus delay time was 0.16 min, and control experiments with water alone measured a background absorption of ~20 µmol $CO_2$.

Analysis of the time progression of the 4.3 µm $CO_2$ absorption signal afforded information on the relative speeds of the $CO_2$ capture reactions. For slow-reacting samples, the kinetics of the reaction could be followed through a majority of the run and, therefore, the initial observed rate could be quantified by fitting/extrapolating back to t=0. For fast-reacting amines, including MEA, the $CO_2$ absorbance rate was faster than the feed rate (flow rate q), leading to a period of saturation in the signal wherein substantially all of the $CO_2$ gas was absorbed by the amine and, thus, could not be measured in the gas stream. In these instances, the initial observed rate could not be extrapolated and was substituted with a breakthrough time to, which was defined as the time the signal stayed in saturation before signal roll off. The breakthrough time to can roughly be considered a surrogate for reaction time because the fast-reacting amines typically have short transitions from saturation to baseline (e.g., no $CO_2$ absorption), leaving most of the $CO_2$ absorption occurring during saturation.

The results measured for 2-aminocyclohexanol, cis-1,2-diaminocyclohexane, and meglumine are indicated by arrows from the structures to corresponding data points on the graph 200 in FIG. 1. The measured $CO_2$ capture capacities ("$CO_2$ Capacity" in moles $CO_2$/mole amine) and reaction rates ($s^{-1}$) are also shown in Table 1. Additionally, for reference, the results observed with MEA are shown in Table 1. As shown in Table 1, each of the disclosed carbon capture amine solvents demonstrated a larger $CO_2$ capture capacity, and faster rate of reaction with $CO_2$, than MEA.

TABLE 1

| Amine | $CO_2$ Capacity | Reaction Rate |
|---|---|---|
| Monoethanolamine (MEA) | 0.55 | 0.13 |
| 2-Aminocyclohexanol | 0.75 | 0.35 |
| Meglumine | 0.71 | 0.20 |
| cis-1,2-Diaminocyclohexane | 0.56 | 1.69 |

Various embodiments of the present disclosure are described herein with reference to the related drawings, where like numbers refer to the same component. Alternative embodiments can be devised without departing from the scope of the present disclosure. It is noted that various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus. Further, the word "providing" as used herein can refer to various actions such as creating, purchasing, obtaining, synthesizing, making available, etc. or combinations thereof.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

Unless otherwise noted, ranges (e.g., time, concentration, temperature, etc.) indicated herein include both endpoints and all numbers between the endpoints. Unless specified otherwise, the use of a tilde (~) or terms such as "about," "substantially," "approximately," "slightly less than," and variations thereof are intended to include the degree of error associated with measurement of the particular quantity based upon the equipment available at the time of filing the application. For example, "about" can include a range of +8% or 5%, or 2% of a given value, range of values, or endpoints of one or more ranges of values. Unless otherwise indicated, the use of terms such as these in connection with a range applies to both ends of the range (e.g., "approximately 1-5 g" should be interpreted as "approximately 1 g-approximately 5 g") and, in connection with a list of ranges, applies to each range in the list (e.g., "about 1-5 g, 5-10 g, etc." should be interpreted as "about 1 g-about 5 g, about 5 g-about 10 g, etc.").

As discussed above, CPIs and other compounds herein include R groups (e.g., R, R', and Rx, where x is an integer), which can be any appropriate organic substituent known to persons of ordinary skill. In some embodiments, the R groups can include substituted or unsubstituted aliphatic groups. As used herein, the term "aliphatic" encompasses the terms alkyl, alkenyl, and alkynyl.

As used herein, an "alkyl" group refers to a saturated aliphatic hydrocarbon group containing from 1 to 20 (e.g., 2 to 18, 2 to 8, 2 to 6, or 2 to 4) carbon atoms. An alkyl group can be straight, branched, cyclic, or any combination thereof. Examples of alkyl groups include, but are not limited to, methyl, ethyl, propyl, isopropyl, butyl, isobutyl, sec-butyl, tert-butyl, n-pentyl, n-heptyl, or 2-ethylhexyl. An alkyl group can be substituted with one or more substituents or can be multicyclic as set forth below. Unless specified otherwise, the term "alkyl," as well as derivative terms such as "alkoxy" and "thioalkyl," as used herein, include within their scope, straight chain, branched chain, and cyclic moieties.

As used herein, an "alkenyl" group refers to an aliphatic carbon group that contains from 2 to 20 (e.g., 2 to 18, 2 to 8, 2 to 6, or 2 to 4) carbon atoms and at least one double bond. Like an alkyl group, an alkenyl group can be straight, branched, or cyclic, or any combination thereof. Examples of an alkenyl group include, but are not limited to, allyl, isopropenyl, 2-butenyl, and 2-hexenyl. An alkenyl group can be substituted with one or more substituents as set forth below.

As used herein, an "alkynyl" group refers to an aliphatic carbon group that contains from 2 to 20 (e.g., 2 to 18, 2 to 8, 2 to 6, or 2 to 4) carbon atoms and has at least one triple bond. Like an alkyl group, an alkynyl group can be straight, branched, or cyclic, or any combination thereof. Examples of an alkynyl group include, but are not limited to, propargyl and butynyl. An alkynyl group can be substituted with one or more substituents as set forth below.

The term "alkylthio" includes straight-chain alkylthio, branched-chain alkylthio, cycloalkylthio, cyclic alkylthio, heteroatom-unsubstituted alkylthio, heteroatom-substituted alkylthio, heteroatom-unsubstituted Cn-alkylthio, and heteroatom-substituted Cn-alkylthio. In some embodiments, lower alkylthios are contemplated.

The term "haloalkyl" refers to alkyl groups substituted with from one up to the maximum possible number of halogen atoms. The terms "haloalkoxy" and "halothioalkyl" refer to alkoxy and thioalkyl groups substituted with from one up to five halogen atoms.

As described herein, compounds of the present disclosure can optionally be substituted with one or more substituents, such as are illustrated generally above, or as exemplified by particular classes, subclasses, and species of the present disclosure. Each substituent of a specific group may further be substituted with one to three of, for example, halogen, cyano, sulfonyl, sulfinyl, carbonyl, oxoalkoxy, hydroxy, amino, nitro, aryl, haloalkyl, and alkyl. For instance, an alkyl group can be substituted with alkyl sulfonyl and the alkyl sulfonyl can be optionally substituted with one to three of halogen, cyano, sulfonyl, sulfinyl, carbonyl, oxoalkoxy, hydroxy, amino, nitro, aryl, haloalkyl, and alkyl.

In general, the term "substituted" refers to the replacement of hydrogen radicals in a given structure with the radical of a specified substituent. Specific substituents are described above in the definitions and below in the description of compounds and examples thereof. Unless otherwise indicated, an optionally substituted group can have a substituent at each substitutable position of the group, and when more than one position in any given structure can be substituted with more than one substituent selected from a specified group, the substituent can be either the same or different at every position. A ring substituent, such as a hetero cycloalkyl, can be bound to another ring, such as a cycloalkyl, to form a spiro-bicyclic ring system, e.g., both rings share one common atom. As one of ordinary skill in the art will recognize, combinations of substituents envisioned by this present disclosure are those combinations that result in the formation of stable or chemically feasible compounds.

Modifications or derivatives of the disclosed compounds are contemplated as being useful with the methods and compositions of the present disclosure. Derivatives may be prepared, and the properties of such derivatives may be assayed for their desired properties by any method known to those of skill in the art. In certain aspects, "derivative" refers to a chemically modified compound that still retains the desired effects of the compound prior to the chemical modification.

The descriptions of the various embodiments of the present disclosure have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A process of point-source carbon dioxide (CO2) capture, comprising:
    mixing a post-combustion gas with a composition comprising cis-1,2-diaminocyclohexane and at least one amine solvent selected from the group consisting of 2-aminocyclohexanol and meglumine.

2. The process of claim 1, wherein the composition is an aqueous solution with a total amine concentration of about 30%.

3. The process of claim 1, wherein the composition is an aqueous solution of the cis-1,2-diaminocyclohexane and the at least one amine solvent.

4. The process of claim 1, wherein the composition further comprises an additional amine solvent selected from the group consisting of methyl diethanolamine, dimethylethanolamine, piperidine, 2-amino-2-methyl-1-propanol, and monoethanolamine.

5. The process of claim 1, wherein the process further comprises obtaining a $CO_2$-rich amine solution formed by absorption of $CO_2$ from the post-combustion gas during the mixing.

6. The process of claim 5, wherein the process further comprises removing the absorbed $CO_2$ from the $CO_2$-rich amine solution, and wherein the removing regenerates the composition.

7. The process of claim 6, further comprising mixing new post-combustion gas with the regenerated composition.

8. The process of claim 6, wherein the removing comprises mineralizing the absorbed $CO_2$.

9. The process of claim 6, wherein the removing comprises treating the $CO_2$-rich amine solution with pressurized steam.

10. A process of point-source carbon dioxide ($CO_2$) capture, comprising:
    reacting the $CO_2$ with a solution comprising cis-1,2-diaminocyclohexane.

11. The process of claim 10, further comprising removing a product of the reacting to regenerate the cis-1,2-diaminocyclohexane.

12. The process of claim 11, wherein the product comprises a carbonate.

* * * * *